Patented Feb. 19, 1929.

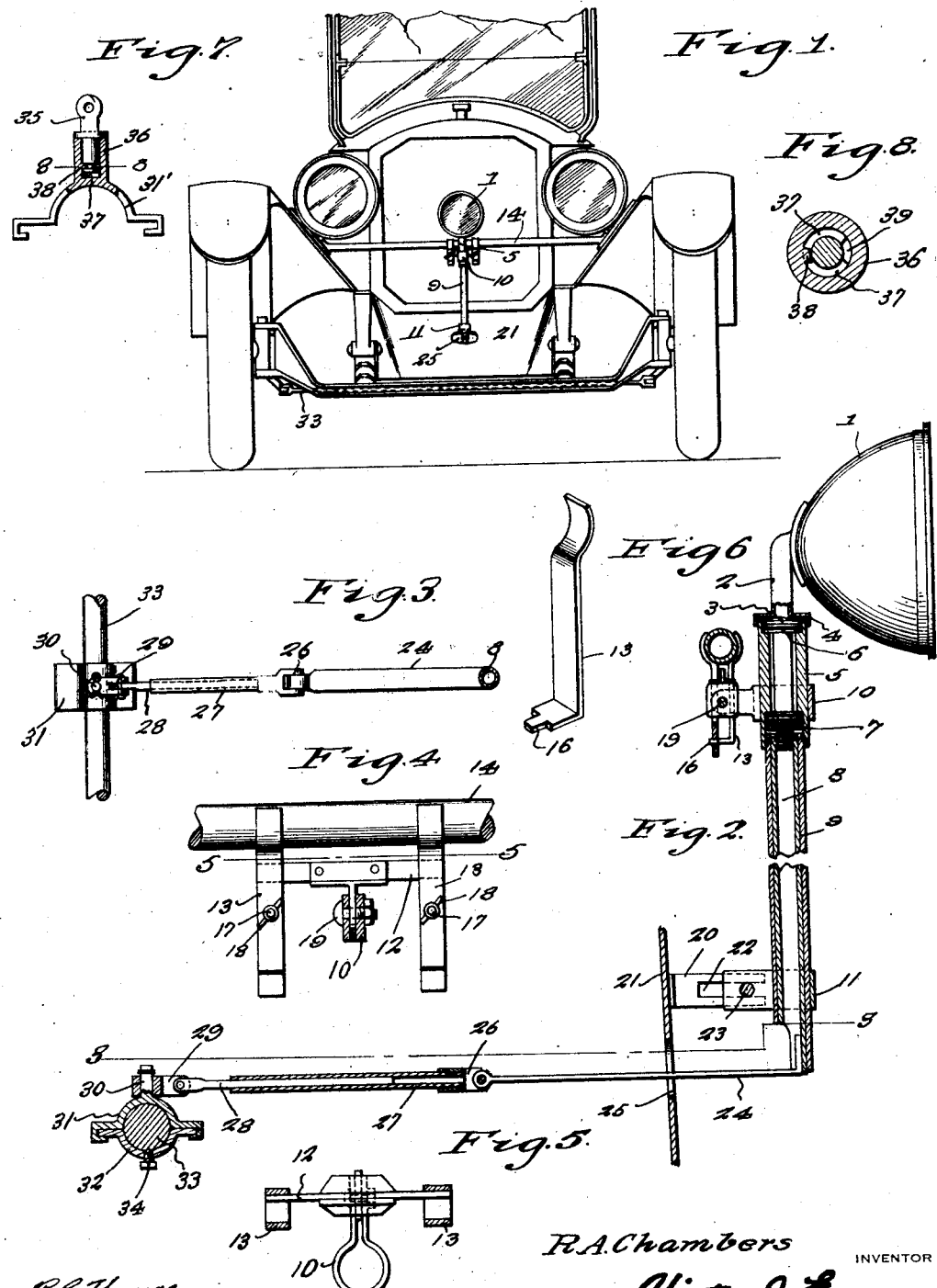

1,702,594

UNITED STATES PATENT OFFICE.

REUBEN A. CHAMBERS, OF JACKSON, MISSISSIPPI.

SPOTLIGHT CONTROL.

Application filed April 4, 1927. Serial No. 180,937.

This invention relates to a dirigible headlight for motor vehicles and the like, the general object of the invention being to provide means whereby the device can be easily and quickly attached to a vehicle and to the connecting rod of the steering mechanism for the vehicle so that the lamp will be moved with the front wheels and thus illuminate the road as the vehicle is taking a curve in the road so that the road will be clearly illuminated and there will be no danger of the driver striking objects or running off the road in taking a curve, as there is when he must rely on the illumination from the regular headlamps of the car.

Another object of the invention is to so arrange the parts that they will adjust themselves to the various movements of the vehicle, due to irregularities in the road surface, without damaging the parts or interfering with the proper functioning of said parts.

A further object of the invention is to so form the parts that the device can be readily attached to various makes and types of vehicles.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a front view of an automobile showing the invention attached thereto.

Figure 2 is a vertical sectional view through the device, with parts of the vehicle in section.

Figure 3 is a section on line 3—3 of Figure 2.

Figure 4 is a view of the means for clamping the upper lamp support to the fender tie rod of the vehicle, a part of the tie rod being shown.

Figure 5 is a section on line 5—5 of Figure 4.

Figure 6 is a view of the front member of one of the clamps shown in Figure 4.

Figure 7 is a sectional view, showing a modified form of clamp member for engaging the connecting rod of the vehicle.

Figure 8 is a section on line 8—8 of Figure 7.

In these drawings 1 indicates the lamp and 2 indicates the hollow standard of the lamp which is formed with a flange 3 and a cap 4. This standard passes through a tubular support 5 which has its upper end formed with a recess to receive the flange 3 and anti-friction bearings 6 are placed in this recess and engage the flange. The cap 4 fits tightly over the upper end of the member 5. The lower end of the member 5 is also provided with a recess to receive the threaded lower end of the standard, and anti-friction means 7 are placed in this recess and engage the standard so that the standard is firmly but rotatably supported by the member 5. A tube 8 has its upper end threaded to receive the threaded portion of the standard, and these parts are suitably connected together so that turning movement thereof will not cause the parts to separate. A tubular member 9 surrounds the tube 8 and has its upper end threaded to the lower walls of the recess at the lower end of the member 5.

A clamp 10 engages the member 5 and a clamp 11 engages the lower end of the member 9. The clamp 10 is pivotally connected to a depending part of a bar 12 which has its ends fastened to the inner members of a pair of clamps 13 which are adapted to engage the tie rod 14 at the front of the vehicle. The front member of each pair has its lower end bent at right angles and formed with a tongue 16 for engaging a slot in the rear member, and the two members of each pair are connected together by a bolt 17 on which is placed a wing nut 18. Thus the two clamps can be easily and quickly clamped to the tie rod so as to support the member 5 at the front of the car. After the parts are properly adjusted, the bolt 19, which pivots the clamp 10 to the bar 12, is tightened.

A bracket 20 is fastened to the apron 21 at the front of the car, and this bracket is provided with a slot 22 to receive a bolt 23 which fastens the clamp 11 to the bracket.

This manner of supporting the members 5 and 9 from the vehicle enables the device to be attached to various makes and kinds of vehicles by properly adjusting the parts.

A flat bar 24 is fastened to the lower end of the tube 8 and this bar passes through a hole 25 formed in the apron 21 and has its inner end pivoted to a coupling 26 which is attached to a tube 27 into which telescopes a rod 28 which is pivoted to a clip 29 rotatably mounted on a stud 30 formed on the upper member 31 of a clamp, the lower member 32 of which has sliding connection with the upper member so that the clamp can be easily and quickly placed on the connecting rod 33 of the steering mechanism of the vehicle. After the parts of the clamp are put in place, a screw 34, which is carried by the lower member 32, is tightened, which tends to frictionally hold the two parts of the clamp together and upon the rod.

From the foregoing it will be seen that as the rod 33 is moved longitudinally, when the steering mechanism is operated to turn the front wheels of the vehicle, this movement will be communicated to the tube 8 and to the lamp standard through means of the telescopic members and the bar 24, and thus the lamp 1 will be turned in the same direction the wheels are turned to throw the light rays in the same direction the car is moving, and thus the road will be fully illuminated as the car takes the curve. The pivotal connection between the rod 24 and the coupling and between the clip 29 and the clamp, as well as the telescopic member, will permit the parts to adjust themselves to all movements of the running gear in relation to the body without damaging the parts and without interfering with their functions. The rod 24 is shaped to accommodate the vehicle on which it is designed to be used so that there will be sufficient clearance between itself and the various parts of the vehicle.

Figures 7 and 8 show a slight modification in which the clip 29 is omitted and the rod 28 is pivoted to a pin 35 which engages a socketed projection 36 on the member 31′ of the clamp. The pin 35 is provided with a groove 37 for receiving a projection 38 in the socket to rotatably hold the pin in the socket. The lower wall of the groove is recessed, as at 39, to permit the entrance of the projection in the groove. Thus by turning the pin until the recess 39 is opposite the projection, the projection can enter the groove and then by turning the pin to its proper position, the pin will be held in the socket and there is no danger of it coming out of the socket during the operation of the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A dirigible lamp for a motor vehicle comprising a lamp casing, a standard connected therewith, a tubular supporting member in which a part of the standard is rotatably mounted, adjustable and detachable means for supporting the tubular supporting member from the tie rod at the front of the vehicle, a tubular member connected with the lower end of the supporting member and surrounding the lower part of the standard, adjustable and detachable means for connecting a part of the last mentioned tubular member with the apron of the vehicle, a rod having its upwardly bent end fastened to the lower end of the standard, said rod passing through a hole in the apron of the vehicle, a tubular member pivotally connected with the rear end of the rod, a second rod slidably mounted in the tubular member, a clamp, a part rotatably connected with the clamp and to which the last mentioned rod is pivotally connected and means for fastening the clamp to the connecting rod of the steering mechanism of a vehicle.

In testimony whereof I affix my signature.

REUBEN A. CHAMBERS.